Sept. 6, 1927.　　　　G. H. DAVIS　　　　1,641,922
MOLDING PRESS
Filed July 18, 1925　　　9 Sheets-Sheet 1

INVENTOR
George Howlett Davis
BY
J. Granville Meyers
ATTORNEY

Sept. 6, 1927.  G. H. DAVIS  1,641,922
MOLDING PRESS
Filed July 18, 1925  9 Sheets-Sheet 2

INVENTOR
George Howlett Davis
BY
ATTORNEY

Sept. 6, 1927.  1,641,922
G. H. DAVIS
MOLDING PRESS
Filed July 18, 1925   9 Sheets-Sheet 3

INVENTOR
George Howlett Davis
BY
ATTORNEY

Sept. 6, 1927.
G. H. DAVIS
1,641,922
MOLDING PRESS
Filed July 18, 1925
9 Sheets-Sheet 4
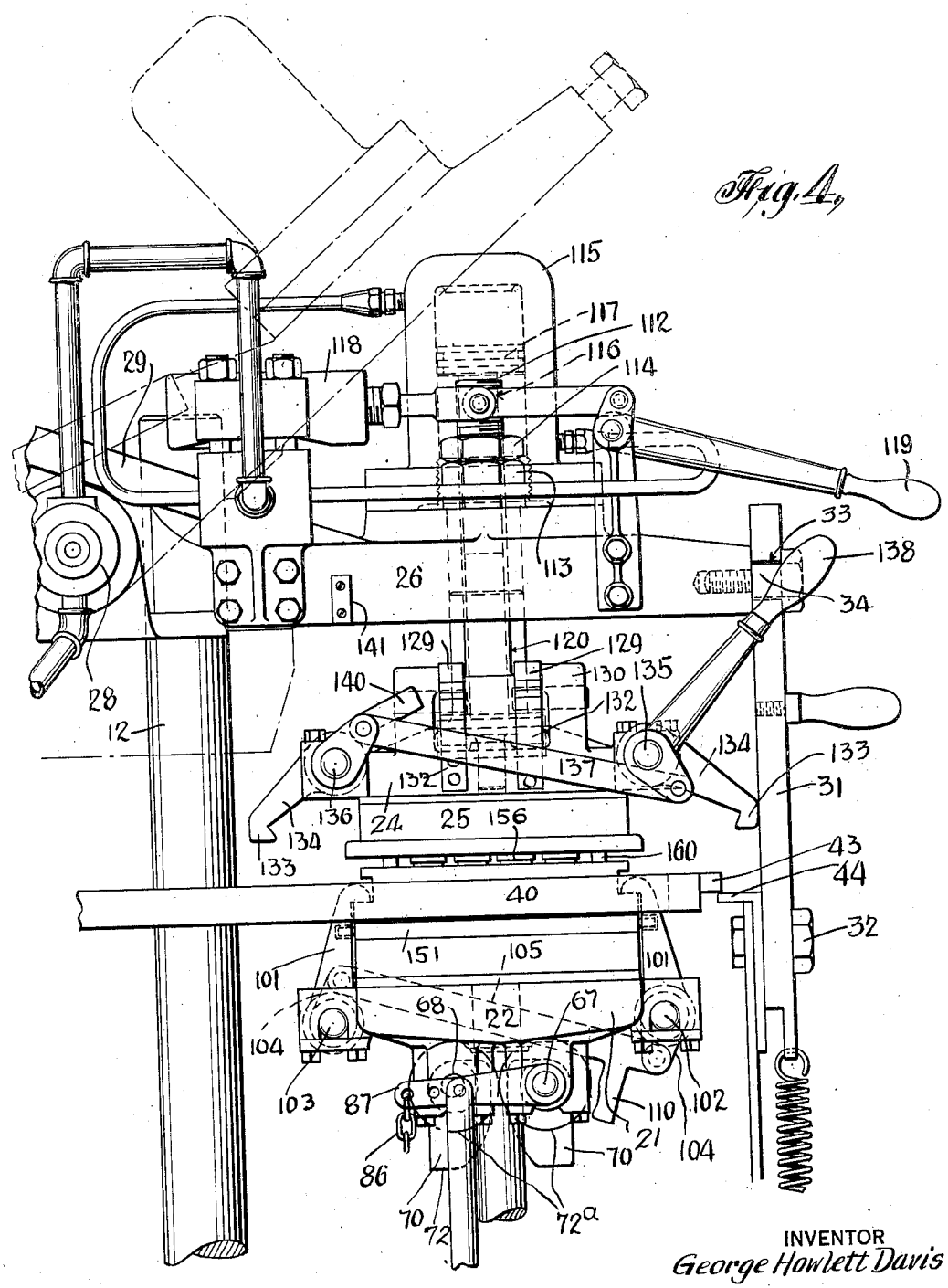
INVENTOR
George Howlett Davis
BY
ATTORNEY

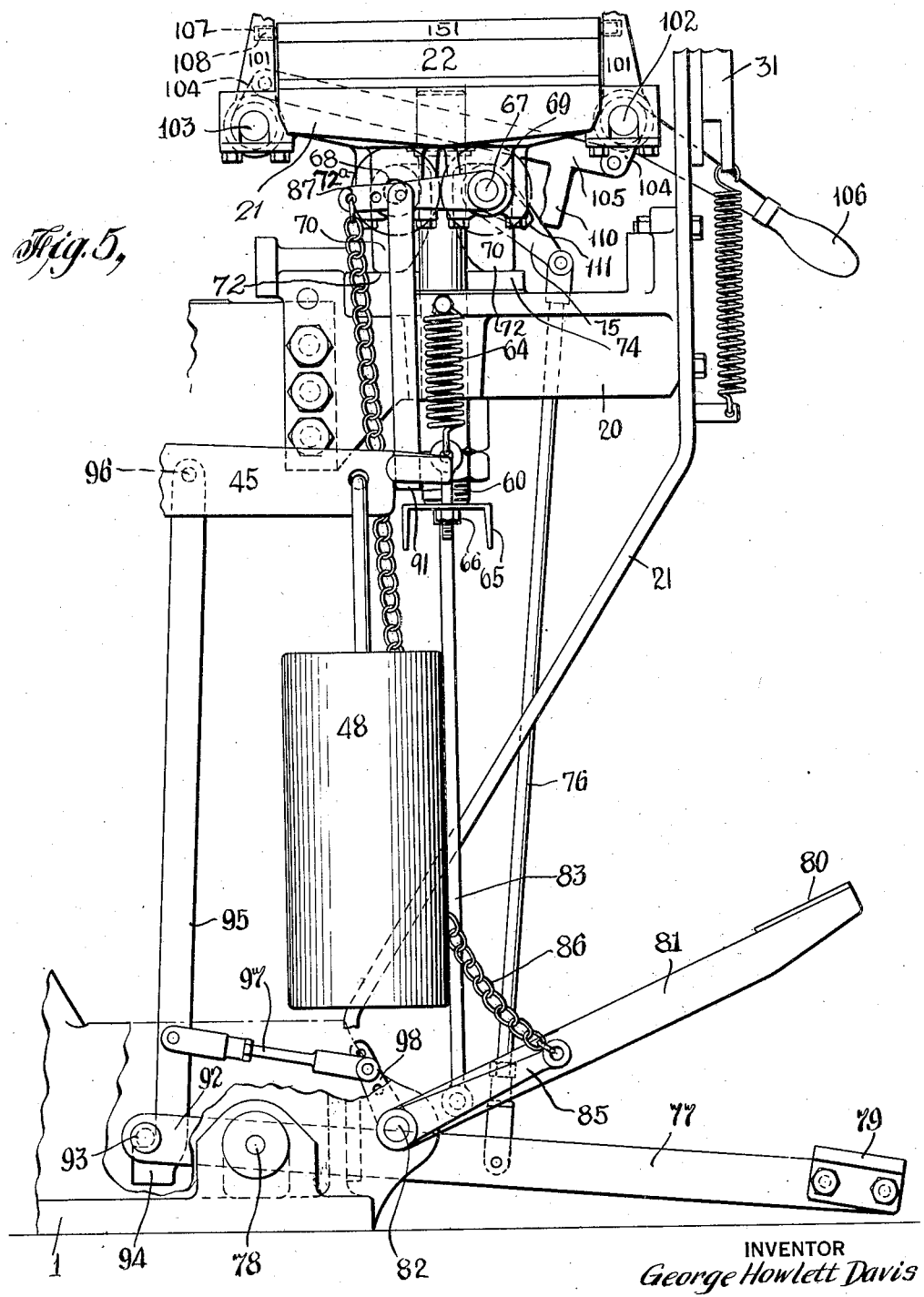

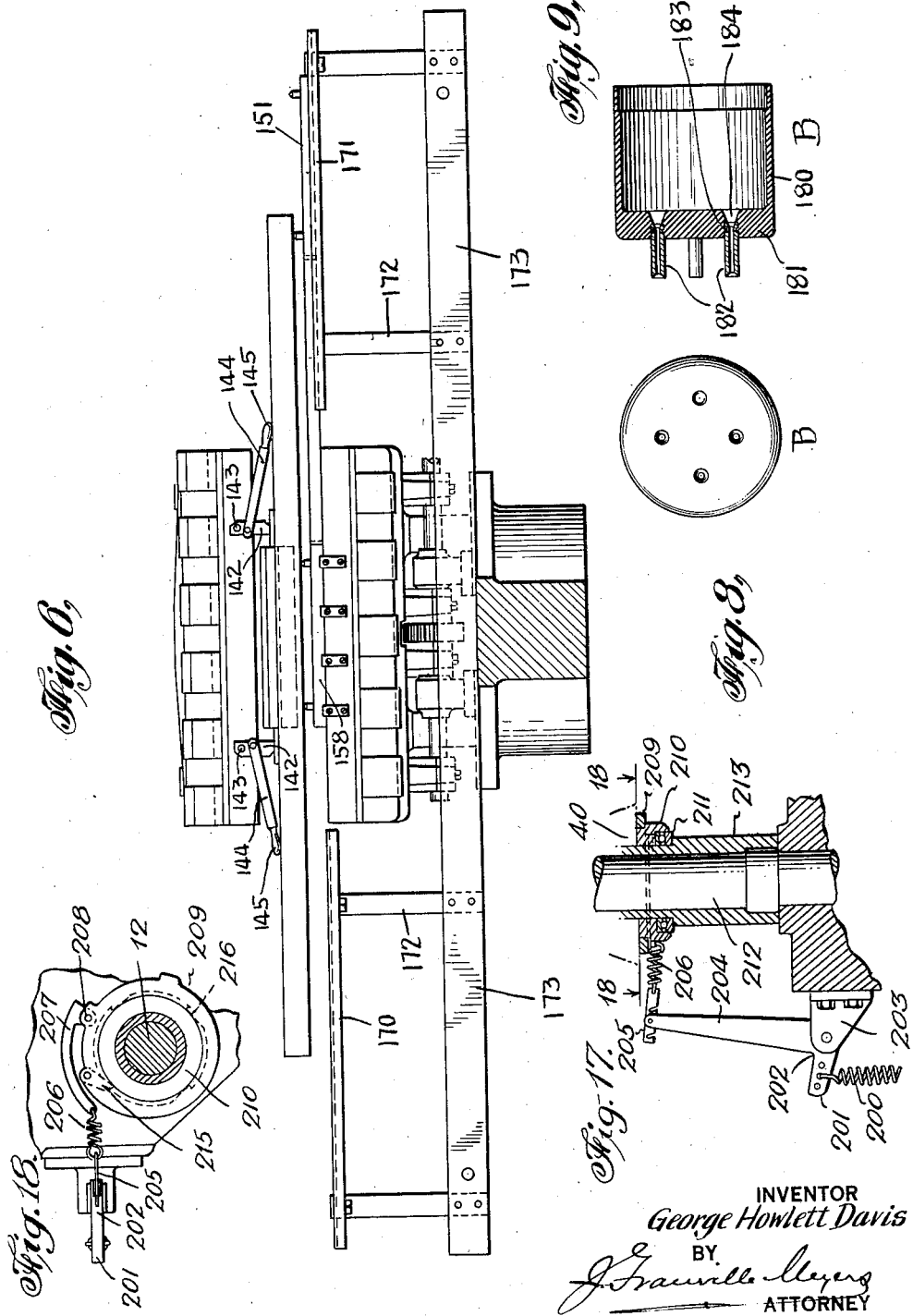

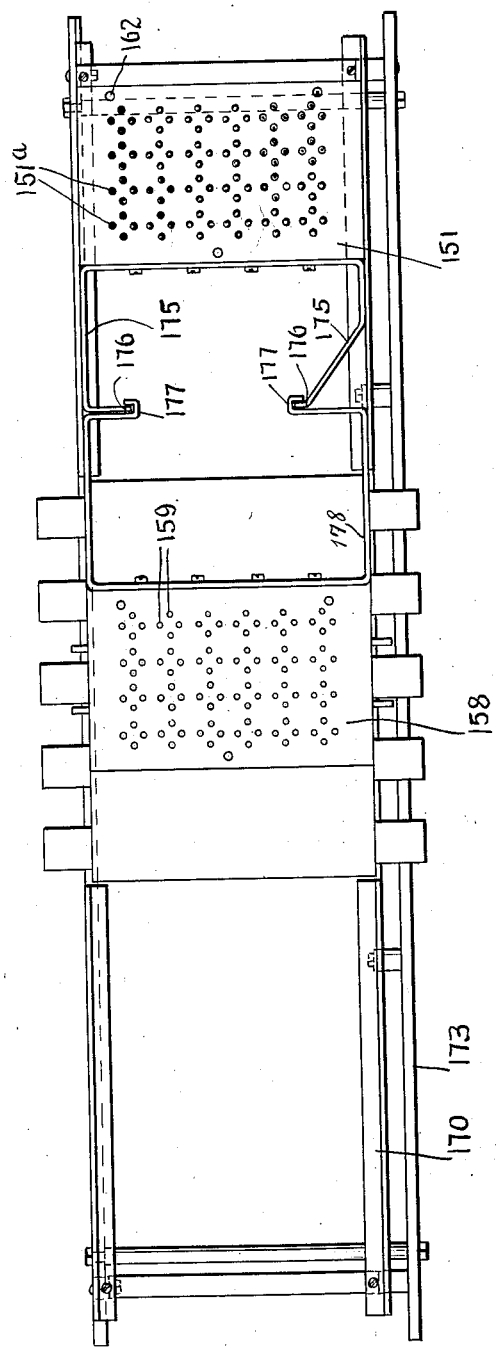

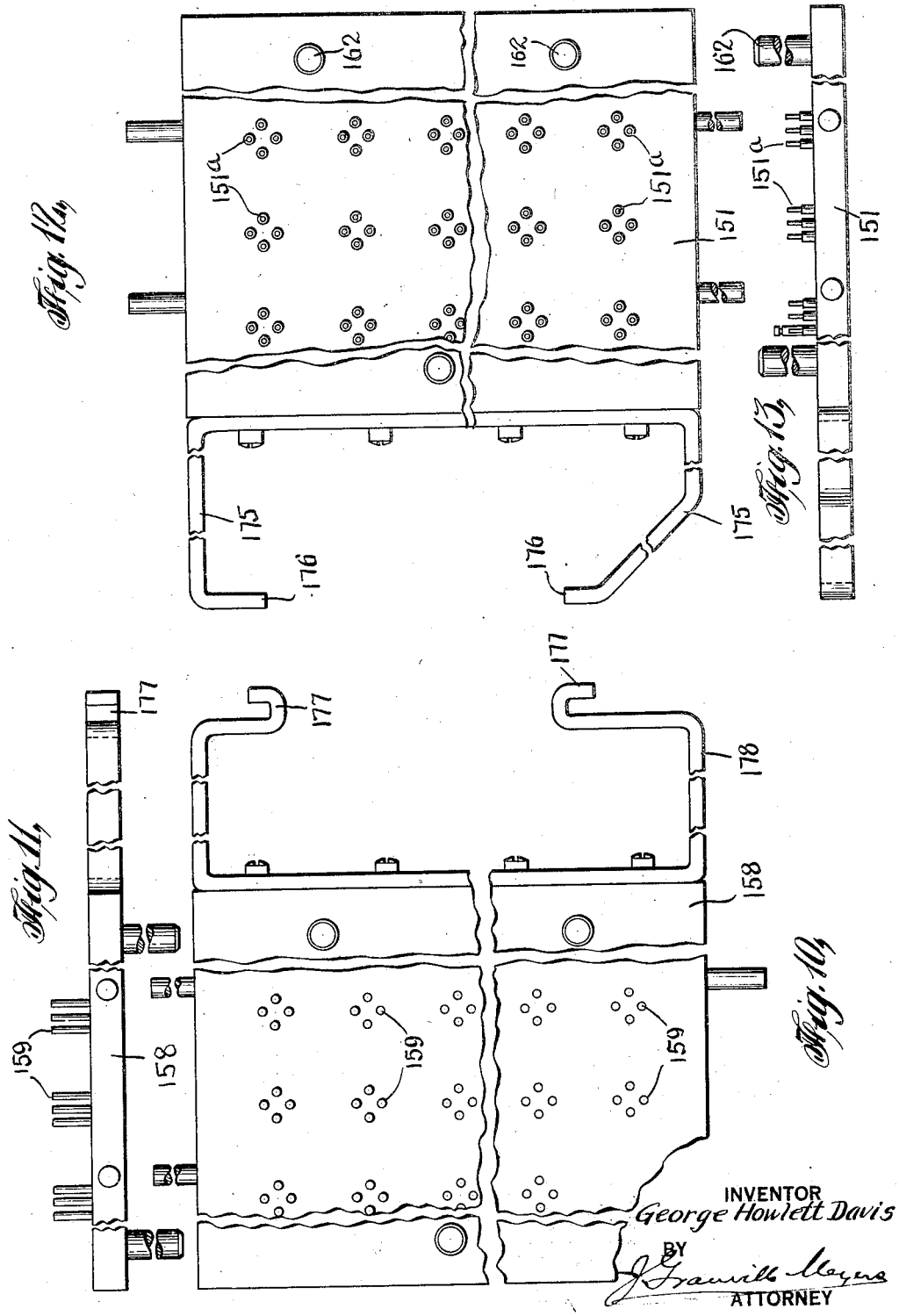

Sept. 6, 1927. 1,641,922
G. H. DAVIS
MOLDING PRESS
Filed July 18, 1925 9 Sheets-Sheet 9
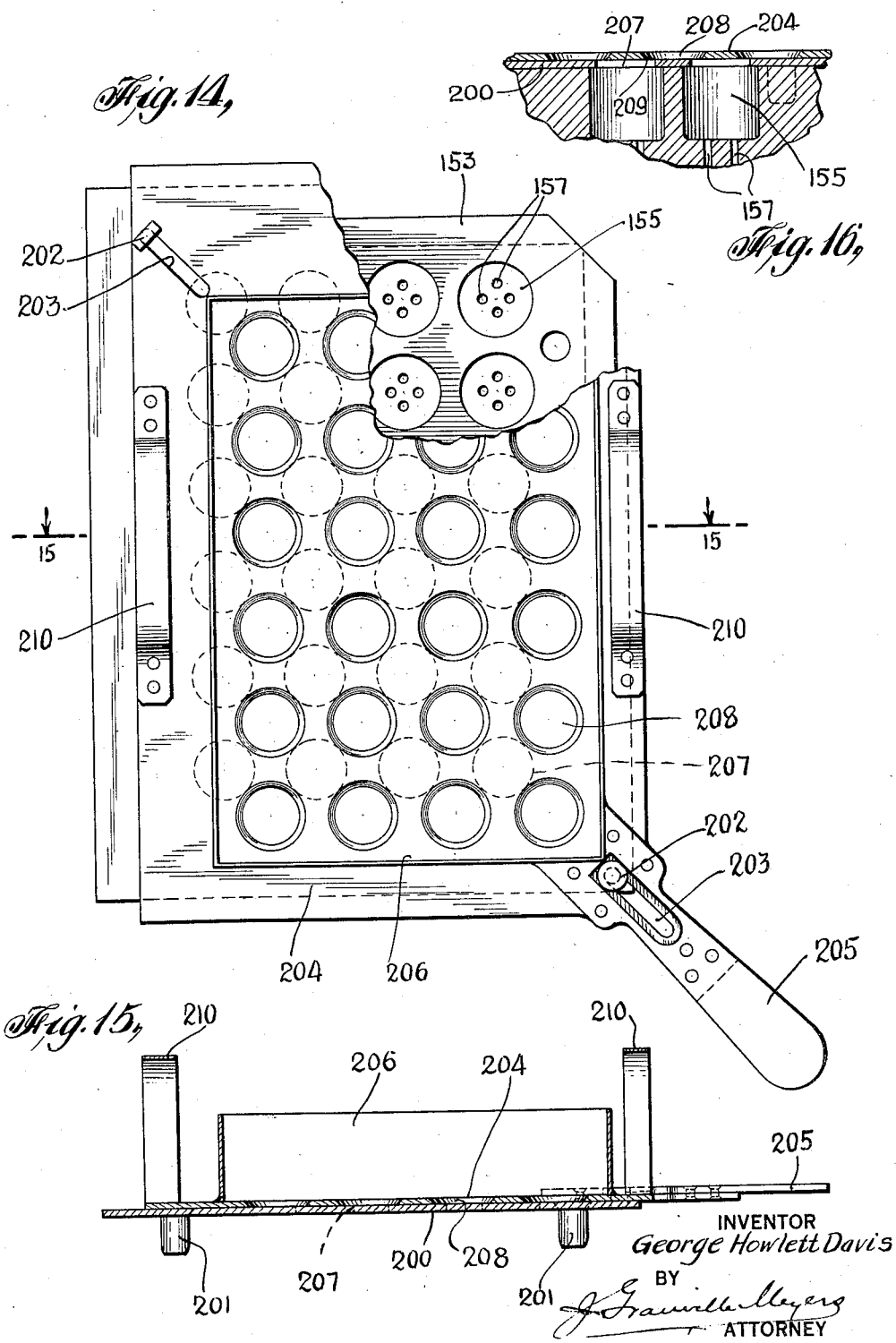

Patented Sept. 6, 1927.

1,641,922

UNITED STATES PATENT OFFICE.

GEORGE HOWLETT DAVIS, OF NEWARK, NEW JERSEY.

MOLDING PRESS.

Application filed July 18, 1925. Serial No. 44,579.

My invention relates to presses for molding plastics and is in many respects similar to the invention disclosed in my prior application, Ser. No. 700,337, filed March 19, 1924; but also includes important modifications and improvements, a principal one of which is the provision of a power operated auxiliary or sub-press.

The general object of the present invention is to provide a press of substantially universal character; that is, one which is capable of producing substantially any kind of pressure molded articles rapidly, and at low cost, and which may be operated and enables the entire molding operation to be carried out without heavy demand upon the strength and endurance of the operators, such as has been involved in the operation of presses heretofore used for the production of comparable articles.

The invention as physically embodied includes a main press and an auxiliary or sub-press, which may in some cases be operated by hand power, but preferably is power operated, combined with a movable table arranged to support at least two molds and move them successively from the sub-press to the main press and back again, the table movement preferably being automatic and controlled by movement of the main press plunger. Means are also provided in combination with or adjacent the sub-press for performing practically all of the mold manipulating operations, by suitable actions of the power operated sub-press. Especially all operations which have heretofore required great manual effort by the operator are performed by the power sub-press and the operator is required to exert only moderate effort in manipulating controlling elements.

The entire machine is arranged to handle practically any type of mold such as ordinary two-part molds, and especially to properly handle three-part molds for the production of more complicated articles which cannot be properly or economically produced in two-part molds, and also plastic articles in which inserts (usually metal parts) are incorporated in the molding operation.

The machine is also constructed and arranged to properly handle substantially any class of plastic or moldable material. These materials are practically all included in two main classes: thermo-plastic, and non-thermo-plastic materials. No thermal treatment is required as a rule for non-thermo-plastic materials, but careful provision has to be made for proper thermal treatment of the thermo-plastics, which are practically all divisible into two sub-classes, namely, those that require cooling for their completion, the cooling usually being necessary during the principal or final pressing operation and in some cases being continued after pressing, and those which require heating for completion, the heat usually being applied during the principal or final pressing operation, and heat also being applied in some cases prior to the principal pressing operation. The first sub-class is well represented by materials including shellac or other gum as a principal ingredient or binder, and the second sub-class is well represented by the many varieties of synthetic resins, (or compositions including these resins as a binder). The first sub-class may conveniently be designated as "cold-setting" materials and the second as "hot-setting" materials. The fact that the first sub-class requires cooling while being pressed or for completion, naturally involves the heating of the material prior to pressing to bring it to the proper plastic condition. The hot-setting materials may or may not be preliminarily heated, depending largely on the nature of the material itself or the character of the articles produced. The present invention provides heat-interchange means suitable for the proper treatment of any of the thermo-plastics. The term "heat-interchange", "thermal treatment", or similar expressions as here used, are intended to cover broadly the production of thermal effects upon the plastics, either by supplying heat to or extracting heat from the molds or mold parts.

The characteristics of the various plastics and their mode of treatment by mechanism of the present general type are more fully described in the above identified application, and will not be further referred to herein, except as may be necessary for proper understanding of the present machine and its operation.

The characteristics and advantages of the invention are further sufficiently explained in connection with the following detail description of the accompanying drawings, which show one representative embodiment of the invention. After considering this embodiment, persons skilled in the art will understand that many variations may be made within the principles of the invention, and I contemplate the employment of any structures that are properly within the scope of the appended claims.

Fig. 4 is a left side elevation of the upper part of the sub-press.

Fig. 5 is a similar view of the lower part.

Fig. 6 is a front elevation of the machine showing supporting guides for the base plates in relation to the main frame and upper and lower heads of the sub-press, with certain details of the heads.

Fig. 7 is a horizontal section showing mainly the guide rails in relation to the sub-press.

Fig. 8 is a bottom plan of an audion tube base, as an example of articles for the production of which the press and molds are adapted in the present specific form.

Fig. 9 is an axial section of the same.

Fig. 10 is a top plan of an ejector plate with parts broken away to condense the drawing.

Fig. 11 is a top front side elevation of the same.

Fig. 12 is a top plan of a base plate which is specifically, in the present embodiment, an insert-carrying plate.

Fig. 13 is a front side elevation of the same.

Fig. 14 is a top plan of a mold loader or filler, with some parts broken away.

Fig. 15 is a section at 15—15, Fig. 14.

Fig. 16 is a fragmentary section, enlarged, of a mold chase with upper and lower filler plates located thereon for filling the mold cavities.

Fig. 17 is a fragmentary vertical section in the plane of the front column showing table operating mechanism.

Fig. 18 is a horizontal section at 18—18, Fig. 17.

Figure 1:
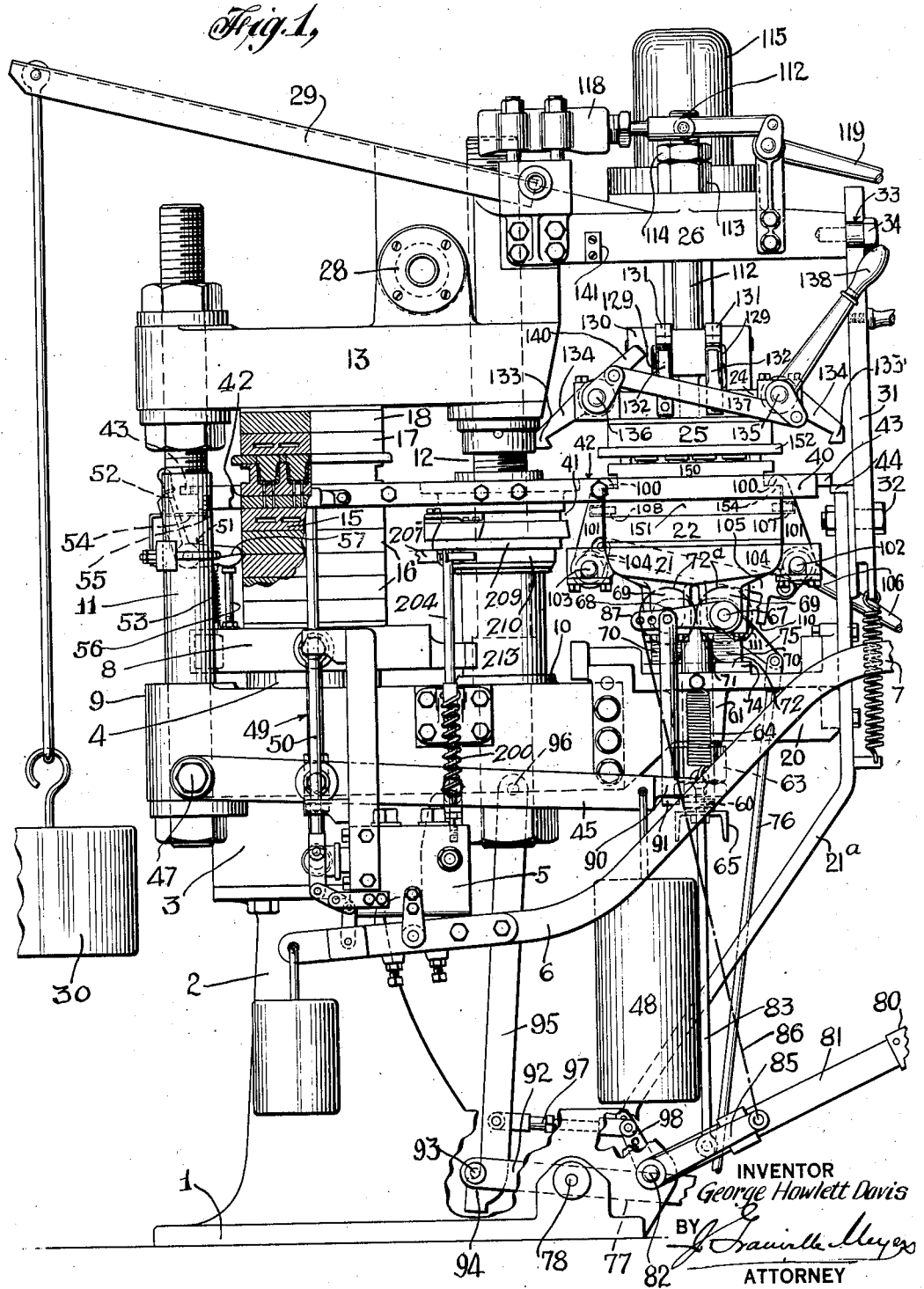
Fig. 1 is a view, partly in left side elevation and partly in section, of a press embodying the invention in one form.

The machine is built upon a base 1, at the rear of which is a main press, including a pedestal 2 supporting a hydraulic cylinder 3 in which is a plunger 4. Movements of the plunger are controlled by any suitable valve mechanism 5, and this mechanism is in turn controlled by a counterweighted lever 6 having a handle 7 convenient to the operator at the front of the machine. The plunger 4 is provided with a head 8.

Connected to or integral with the cylinder structure 3 are rear lugs 9 and a front lug 10 forming lower sockets or connections for rear columns 11 and a front column 12. A top plate or main press abutment 13 is secured to upward portions of the columns. The parts just described are connected by heavy nuts or equivalent means to take up the powerful thrust of the main press.

A thermal jacket 15 is mounted on the plunger head 8, directly or with one or more interposed spacers 16 to properly position the jacket 15, with due regard to the vertical dimension of the mold. An upper thermal jacket 17 is secured to the top or abutment plate 13, with or without interposed spacers 18 to properly position the jacket. The head 8 may be considered and referred to as the lower platen of the rear or main press, or when the thermal jacket 15 is employed for heating or cooling the work, that may be considered the lower platen, since it is operatively an extension of head 8. Similarly, the top plate 13 or the top thermal jacket 17 may be considered the upper platen of the main press.

Another press, arranged also for manipulating operations, and referred to without limiting significance in broader aspects of the invention as a sub-press, is arranged at the front of the machine as follows: Frame members 20 extend forward from the cylinder structure 3 and the front ends of these members are additionally braced and supported by struts 21ª. These frame parts support a vertically movable lower head or platen 21 of the sub-press, on which is mounted a thermal jacket 22 with or without interposed spacers to properly position the jacket, as in the main press; or if heat treatment is not desired at the sub-press or loading station, the thermal jacket may be omitted and the spacer provided to properly co-operate with the mold at that point, or lower platen 21 may be repositioned to co-operate with the particular mode employed. An upper head or platen 24 is located above the lower platen, and may be provided with a thermal jacket 25, or other variations may be made, as sufficiently explained in connection with the lower platen and its appurtenances. The upper platen is mounted for vertical movement in a movable frame member 26 which may be identified, without limiting significance in its broader aspects, as a swing frame. This is pivoted by means of heavy trunnions 28 on the top plate 13, and arms 29 extend upward and rearward and carry counter-weights 30, to practically counter-balance (or slightly over-balance) the swing frame with its upper platen and other parts, so that only moderate manual effort is required to move the swing up and down. The swing frame is secured in its lower or active position by a heavy hold-down latch 31, pivoted at 32 to fixed frame members. The latch has a jaw 33 engaging a stud 34 secured in the front end of the swing frame. The construction, arrangement and appurtenances of the sub-press will be fully described hereafter.

A table 40 is arranged to revolve on or about the front column 12. Desirably, the table is supported on any suitable thrust bearing 41. The table is provided with at least two diametrically opposite mold openings 42, and when the table is substantially circular at least two other mold openings may be provided, these being also diametrically opposite and arranged between the first named openings. Since in the present specific embodiment of the invention only two opposite molds will be used at a time, the provision of more than one pair of openings permits the openings to be dimensioned for molds of different sizes, and either set of openings with appropriate molds may be used by merely repositioning the table by turning it one-quarter revolution at the beginning of a production run.

Adjacent the mold apertures the table may be provided with projecting flanges 43 which overlie a ledge 44 provided on the upper ends of frame braces 21 to support the table adjacent the sub-press and loading station.

To aid the down-stroke of the main press plunger, levers 45 and 46 are fulcrumed at 47, one at each side of the machine. The forward ends of these levers have heavy counterweights 48 and they are connected by links 49 to the plunger head 8. These levers are also utilized to perform certain other functions referred to hereafter. For the purpose of automatically rotating the table to effect mold transfer, one of the levers, as 45, Fig. 1, is connected by a spring 200 (see also Figs. 17 and 18) to an adjustable point on the short arm 201 of a bell crank 202, fulcrumed in a frame bracket 203. The long arm 204 of the bell crank is connected by means of an adjustable link 206 to another link 207 which is pivotally connected at 208 to a collar 209. This collar is mounted to rotate about another collar 210. Collar 210 is in turn connected to the table 40 and is provided with a thrust bearing 211 by which the collar may rotate about the front column 12 and at the same time support the weight of the table upon a sleeve 213, which is located about the column. The collar 209 is provided with a pawl 215 (Fig. 18) to cooperate with notches 216 in collar 210. By the action of this mechanism, upon each down stroke of the main plunger the ratchet mechanism causes the table to be rotated one-half turn, to automatically shift a mold from the press to the sub-press or loading station, and to also shift a mold from the sub-press to the main press. Safety mechanism is provided, including linkage connected to the main valve lever 6, and a vertical stop rod 50 co-operating with notches in the periphery of the table, substantially similar to that described in the above identified application, to prevent the lever being moved to admit fluid to the cylinder, to raise the plunger, unless the table is stationary and in properly registered position, with a mold properly located in the main press and also one properly located in the sub-press. When the table is in such proper position a table notch is in registry with a shoulder on the vertical rod 50, and the rod may move through the notch and so permit the lever to move to actuate the valve and cause the plunger to be raised for the main pressing operation; but at any time that the table and molds are not in the stated proper position, the table notch is removed from the vertical bar 50 and the bar shoulder will encounter the table; the lever thus cannot be moved and therefore the main press cannot be actuated.

Automatic stop mechanism is also provided substantially as in the above identified application, comprising a bell-crank lever 51 having a member 52 adapted to enter a table notch and stop the table at the end of its proper travel. This bell crank is urged to active position by a spring 53, and is normally held retracted by a detent 54 which has an extension to co-operate with pins 55 set in the under side of the table with due regard to mold positions. As the table approaches the end of its travel to position molds in the presses, one of the pins 55 encounters the detent 54 and retracts it from engagement with stop member 52 which thereupon advances and engages the table notch and positively stops the table in the proper position; in the meantime pin 55 passes the detent 54 which is then ready to reengage the stop member 52 when it is next retracted. This retraction is effected by rise of the main plunger, which brings a stud 56 in engagement with bell crank member 57 and retracts the stop member 52, whereupon it is reengaged by the detent 54, and the table is free to move when lever 6 is properly operated to retract the main plunger.

The lower head or platen 21 of the sub-press is connected to plungers 60 which pass through sleeve 61 in a frame member 62 and are provided with stop nuts 63 below the sleeve to limit upward movement of the head. The weight of the head is partly carried or counter-balanced by springs 64, stretched between a horizontal channel bar 65 which underlies the lower ends of the plungers 60, and fixed points on the frame members 62. These springs reduce the work required to raise head 21 and also cushion the shock of the head drop movement. The bar 65 is secured to the plungers by screws 66. While manually operated means are desirably employed for raising the head, power multiplying devices are provided to reduce the manual effort required. For this purpose cam shafts 67 and 68 are mounted in brackets 69 below the head and are provided with lifting cams 70 having curved cam faces 71 and squared ends 72. The shafts are connected to move simultaneously by gears 72ª. The cams bear on a horizontal plate 74. One of the shafts 67 has an arm 75 connected by a link 76 to a pedal lever 77, pivoted to the base at 78 and having a tread 79 convenient to the operator. Whenever it is desired to raise the lower sub-press head 21, the operator steps on the tread 79 and thereupon the linkage rotates the cam shafts 67 and 68 simultaneously; the cam faces 71 bearing on plate 74 cause the table to raise and finally it is locked in elevated position by the squared cam faces 72 resting on the plate 74 vertically below the shafts 67 and 68.

The head is lowered or permitted to drop by turning the cam shafts and cams in the opposite direction. Preferably, this is accomplished in various ways. The cam shafts may be turned and the table dropped at any time at the will of the operator by stepping on a tread 80 carried in a convenient position by lever arms 81 fulcrumed on a shaft 82. The lever arms are connected by links 83 to bar 65, with moderate lost motion. The lever shaft 82 has an arm 85 connected by a chain 86 (which is usually arranged with substantial slack as shown in Figs. 1 and 5) to an arm 87 fixed on the cam shaft 67. When tread 80 is depressed the chain slack is first taken up and then the pull on arm 87 causes the cams to turn in a direction to lower the head, which will drop by gravity except in certain cases. One such case is when the head is secured to a mold part such as a bottom plate or pin plate, and the plate is in turn held in engagement with another mold part such as the chase by inserts carried by the pin plate and engaging in the molded articles in the chase. When resistance is offered in this or other ways to downward movement of the head, the continued movement of tread 80 after the cams have been operated as above described to release the head, takes up the lost motion of links 83, which then apply a positive pull through cross bar 65 to the head plungers 60 and the head itself, sufficient to pull the connected mold part, such as the pin plate or sometimes an ejector plate, away from the chase.

Figure 3:
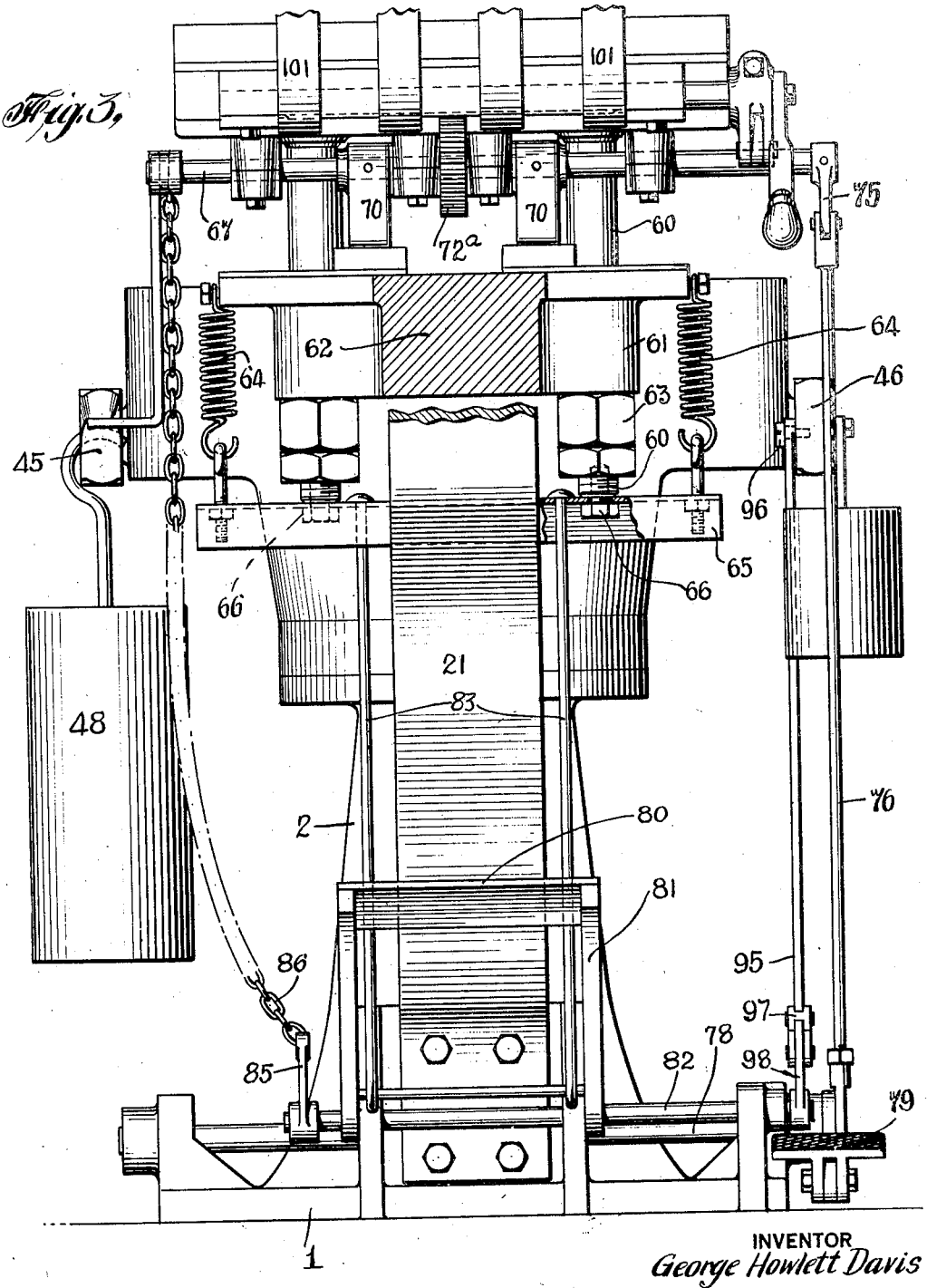
Fig. 3 is a similar view of the lower part of the sub-press.

Provision is desirably made for automatically lowering the lower sub-press head 21 as the main press plunger is lowered at the end of the pressing operation in order to insure that head 21 will be in a downward position to permit an advancing mold carrying completed articles to move into position at the sub-press and charging station without conflict with head 21 or the thermal jacket 22 thereon. For this purpose one of the counterweight levers 45 has an extension 90 which overlies a releasing hook 91 connected to cam shaft arm 87 above mentioned, whenever the lower head is in elevated position, as shown in Figs. 1 or 5. When the main press control lever is moved to cause the main press plunger to drop, lever 45 connected with the plunger also moves downward at its forward end and its extension 90 moves the releasing hook 91 and so through arm 87 causes the cam shafts and cams to rotate and drop the head. Desirably, also, means is provided for automatically raising the lower sub-press head 21, if it is in lowered position, at the beginning of the main pressing operation. This is to relieve the operator from necessity for manually raising the lower sub-press head at this time to properly co-operate with the mold which is to be unloaded as more fully described hereafter. For this purpose lever 77 has a rearward extension 92 provided with a stud 93 which at times overlies a hook 94 formed on the lower end of a link 95 pivoted at 96 to the right-hand main press counterweight lever 46, (as viewed from the front in Fig. 3). The vertical link 95 is connected by a link 97 to an adjustable point on an arm 98 extending upward from shaft 82, which carries lever arms 81 which in turn support the lower sub-press head releasing tread 80 as above described. Ordinarily with the parts in normal position as shown in Figs. 1 or 5, when the main press plunger rises at the beginning of the main pressing operation, hook 94 rises along with it and oscillates sub-press head lifting lever 77 in the lifting direction, that is, its tread end moves downward and the head 21 is lifted by the action of link 76, the cam shafts and cams, in the same way as if the lever had been depressed by the foot of the operator. Thereafter when the operator desires to drop the head 21 during any of the various mold manipulating operations while the main pressing operation continues, he steps on tread 80 as usual and in the first movement of lever arm 81 the link 97 retracts hooks 94 from under stud 93, or in other words, frees the table lifting lever in linkage from the automatic connection with the main press plunger above described; further movement of the tread 80 then takes up slack in the chain 86 and the head is dropped in the normal way as fully described above.

For mold manipulating purposes and especially to grip or secure mold sections to the lower head 21, gripper hooks 100 are provided, carried by arms 101 secured in spaced relation on shafts 102 and 103 mounted in bearings at front and rear sides of the head 21. The shafts are connected to simultaneously advance and retract the respective sets of hooks by short arms 104 and a link 105 connecting these arms. A hand lever 106 is connected to one end of the front shaft 102 for manual movement of the gripper hooks. For co-operation with certain forms of molds, such as the three-part molds described below, which include a bottom plate which is in this case specifically a pin plate, the hook arms 101 have holes or sockets 107 to receive studs 108 set in the front and rear edges of the pin plate (and also the ejector plate) and the horizontal length of the hook faces in relation to the studs is such that the studs remain in engagement in the holes after the arms are retracted sufficiently to clear the hooks from the co-operating flange on the central or chase section of the mold.

The connecting link 105 has a lug 110 which co-operates with a cam 111 on the forward cam shaft 67 to automatically operate the gripper arms in certain cases. When the lower head 21 is dropped cam shaft 67 is rotated so that cam 111 extends upwardly to the left; the gripper arms are at this time swung away out clear of the mold, and connecting link 105 is moved to the left so that the lug 110 is close to the front cam shaft 67. When the head is lifted in any of the ways above described, the front cam shaft is rotated clockwise as viewed in Figs. 1 or 3. Cam 111 moves lug 110 to the right, and so through the connecting link swings the gripper arms inward as the head rises, so that their upper ends carrying the hooks pass through apertures in the table adjacent the mold without striking the table, and in a position to readily engage studs on the pin plate or ejector plate, and flanges on the front and rear faces of the chase.

The upper sub-press head 25 is carried by plungers 112 which pass through sleeves in the swing frame 26 and have adjustable stops consisting of nuts 113 and lock nuts 114 to limit downward movement of the head. In a broader aspect of the invention the head may be moved up and down by any suitable means, and if such means acts by manual power, power multiplying means may be employed, such for instance as levers or screws. It is, however, preferred to provide for power actuation of the head so that the operation may be relieved of all physical effort except the small amount required for operating the control handle of the power actuating means, which constitutes the power actuated mechanism of the sub-press of which head 24 is a part. For this purpose a hydraulic cylinder 115 is mounted on top of the swing frame and bolted thereto. A piston rod 116 passes into the cylinder and is provided with a piston 117 arranged for double action, that is for power actuation in either direction by admitting fluid under pressure either below or above the piston, this flow being controlled by a suitable valve mechanism 118 and a valve handle 119. The piston rod 116 has an enlarged portion 120 extending below the swing frame and this enlarged portion has at its lower end a flange 121. The flange or the lower end of the piston rod structure engages the upper face of the upper head 24 to force the latter downward with powerful hydraulic pressure. In some cases the same amount of effort will be sufficient to raise the upper head, even when it carries a mold part with it; but especially when the molds are quite large and may include mold cavities and plungers for forming a plurality of deeply recessed articles, a very powerful pull is required to separate the mold mechanism, and for this purpose power multiplying means are provided, so that the initial powerful effort of the hydraulic cylinder is multiplied many times and this ample force is applied to raise the head and separate the mold sections. In the present specific embodiment of the invention, the plungers 112 are not positively connected to head 24 but have extensions which fit slidably in sockets in the head. The plungers are provided with pins or trunnions 128, and levers 129 pivotally fit the trunnions and are fulcrumed in lugs 130 formed at the top of the head. The power arms of the levers rest on the piston rod flange 121 above referred to. The levers also have outward extensions or dogs 131 overlying with moderate clearance stops 132 secured to the ends of the head. When the piston is moved upward for example in the operation of opening a closed mold containing finished articles and the head movement is therefore powerfully resisted, the initial pull of the piston rod flange 120 is applied to the inner end of levers 129. The levers fulcrum on the plunger trunnions 128, which are urged downward against the positive resistance of the stop nuts 132. The force imparted to the levers is therefore applied to their pivotal connections in the lugs 130 and the multiplication of power applied to the lugs to raise the head is very great because of the short distance between the fulcrum and work points of the levers. The head is thus raised the short distance necessary to "break" open the mold, this being represented by normal clearance between the lever dogs 131 and stops 132; as soon as the mold is moderately opened any great resistance to further movement of the head disappears. At this time the dogs 131 are in contact with the stops 132 and the levers cannot oscillate farther, and the piston rod therefore applies a straight lift to the head by the engagement of flange 121 under the inner ends of the levers. This lever mechanism evidently acts automatically to apply a power-multiplying effect when needed.

Gripping hooks 133 are provided for the upper head, substantially similar to those described in connection with the lower head. These hooks are carried by arms 134 fastened in spaced relation on shafts 135 and 136 at front and rear sides of the upper head. These shafts are connected to move together by a link 137 and one of them is provided with a handle 138, as in the case of lower head gripper mechanism.

On cam shaft 136 is an arm 140 extending upward to co-operate with a stop 141 secured to one side of the swing frame 26. When the upper head is to be manipulated to lift a force plate the gripper hooks are first swung inward to engage front and rear edges of the plate. In this movement arm 140 is raised to vertical position. The head is now raised and the arm passes up alongside stop 141 and the stop then prevents movement of the cam shafts in a direction to cause the grippers to release the plate, until the head is again lowered. In this way inadvertent movement of the grippers which might result in dropping the force plate, is prevented.

Figure 2:
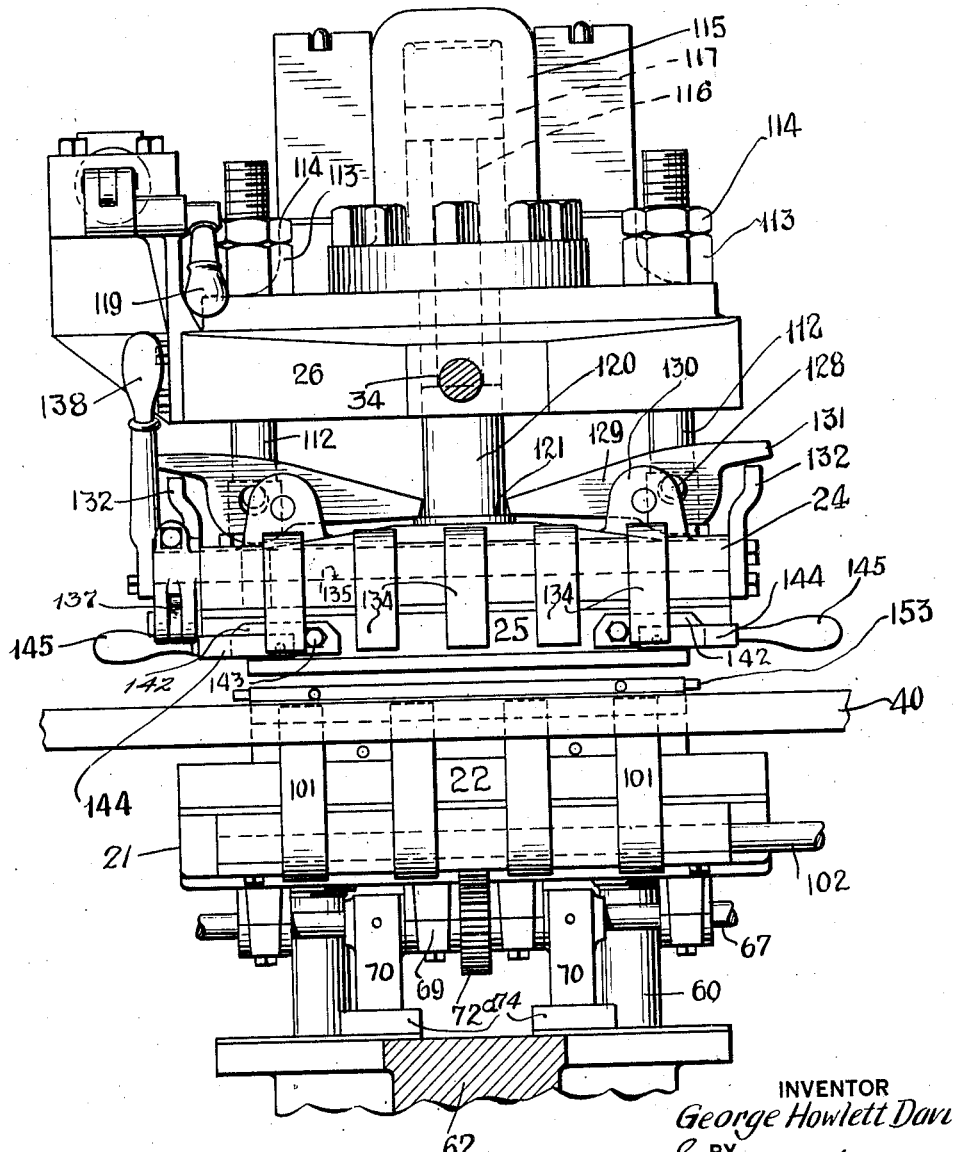
Fig. 2 is a front elevation on larger scale, with some parts broken away or in section, of the upper part of the sub-press.

Spacing lugs 142 are desirably also provided, pivotally connected at 143 to the upper head. These are operated by pivoted yokes 144 provided with handles 145, and serve in certain cases to engage a mold section such as the chase and move it in spaced relation to the upper head or the force plate when the upper head is actuated to move the chase by power, as further explained hereafter. When not in use the lugs are held up in horizontal position, as shown in Fig. 2 by yielding engagement of the yokes or their handles with end portions of the head.

The mechanism as so far described will handle two part molds or molds having more than two parts, for the production of a great variety of articles. Some features are provided, however, including some of those above mentioned, which are especially useful in handling three-part molds and I will now describe one suitable form of three-part mold which is especially useful for producing more or less complicated articles, including those having deep undercuts or depressions and also those requiring metal or other inserts to be incorporated in the molded body during the molding operation; and the above described features of the press and other features described later will be understood as they operate in connection with such three-part or special molds. Such a mold in the representative form shown in the drawings, comprises a body or chase section 150, a base plate or bottom section 151 and a cope section or force plate 152. The chase section is arranged to substantially fit the table mold openings or one of them, and if the mold does not approximately fit the opening, special adapters or spacers (not shown) may be employed. The chase section has at the ends flanges 153 to overlie the table and support the chase thereon, except when it is lifted at one of the press stations. The chase also has along its front and rear faces channels forming lower flanges 154 to fit the gripper hooks 100. The chase usually carries the principal female mold formations such as 155 (Figs. 14 and 16) and the individual molds or pockets may be made in separate inserts or formed in the integral mold body, as preferred. The force plate carries the principal male members or plungers 156. The base plate may be used merely to close apertures 157 extending from the female mold formations in the chase to the lower surface thereof, or it may be used to support and properly apply metal or other inserts. In either case the use of a separate base plate facilitates the proper arrangement and employment of ejector mechanism, consisting principally of another lower or base plate 158 provided with ejector members and which may at the proper time in the molding operation be substituted for base plate 151 to eject the finished articles from the chase or at least to free them by power sufficiently so that they may be easily removed by hand. Where the normal base plate 151 is not arranged to apply inserts, the substituted base plate, such as 158, may nevertheless be provided and supplied with ejector pins 159 as shown to contact with portions of the molded articles through apertures extending to the bottom surface of the chase.

The mold parts are provided with suitable co-operating devices to insure proper registration, sufficiently represented in the present embodiment by dowel pins 160 on the force plate and pins 162 on the base plate, or pin plate and ejector plate, to register in vertical holes in the chase. The dowel pins 162 in the pin plate may be split to provide a spring contact, or they may simply be bent slightly away from vertical position so as to have frictional contact in the chase holes. This frictional contact together with the friction of the inserts in the chase insert holes is sufficient to support the pin plate at the bottom of the chase while it is otherwise unsupported as the mold moves from one position to another. Where there are no inserts the dowel friction is sufficient to support the pin plate or other base plate used.

To facilitate the handling of the mold bottom plate or specifically in the present embodiment the pin plate 151, and the ejector plate when one is necessary, slide supports are provided at either side of the sub-press substantially in line with the lower head 22, or with the thermal jacket thereon, when the lower head is dropped. This arrangement includes the parallel rails 170 at the left side and similar rails 171 at the right side of the lower head, these being supported by uprights 172 from horizontal frame members 173. The pin plate 151 is removably connected to the ejector plate by arms 175 which are formed with members 176 to detachably engaged jaws 177 of another pair of arms 178 on the ejector plate 158, so that the plates can be easily disconnected, but when connected will move simultaneously, so that either one may be pushed over the lower head to proper position below the mold chase while the other is in free position on its rails at one side of the sub-press.

Thus, when the pin plate is positioned under the mold, the ejector plate lies in a free and accessible position on its rails at the left of the sub-press and when the ejector plate is in mold-cooperating position, the pin plate is in a free and accessible position on its rails at the right of the sub-press, and an operator may place the tube base prongs or other desired inserts on the pins 151ª while the main pressing operation is going on and other operations are performed at the sub-press station.

The advantages of the described press and mold constructions and arrangement, and one suitable mode of operating the same will be further explained after describing a particular article which is well adapted to production by presses of this class, and for which the press and molds as above specifically described are particularly adapted. The description of this specific article is not intended to imply any limitation, in broader aspects of the invention, and after considering this product, experts will understand how the press and molds with or without variations within the principles of the invention, may be used for production of a great variety of articles. It is also to be understood that the mode of operation may be varied considerably depending upon the nature of the article and the kind of material used, also that the mold construction and arrangement, and especially the press structure and arrangement may be varied considerably for different articles or materials, or within the principles of the invention as explained and within the scope of the appended claims.

The particular product chosen for illustration is an audion tube base B, Figs. 8 and 9. This has a comparatively thin cylindrical side wall 180, a substantially thicker wall 181, and is to be provided with four metal prongs 182 extending from the bottom and arranged to receive terminal elements of the audion bulb, which must be soldered to the prongs, and for this purpose the prongs are made in the form of small tubes having solid heads. The head ends 183 of the tubes are to be inserted in the bottom wall of the socket and after the socket is completed the tubular formation of the prongs is completed by drilling from the inside as at 184 sufficiently to cut away the central part of the solid head and give access from the inside to the main tubular formations of the prongs, after which the lamp terminal elements can be inserted through the tubular prongs and soldered therein to make proper electrical contact.

The mold cavities 155 in the chase have the complete external contour of the sockets, the arrangement preferably is made to mold a plurality of the sockets at once. The base plate 151 provided for tube base molding may be called a pin plate, since it is provided with a plurality of pins 151ª arranged in groups of four each, each group conforming to the arrangement of the prongs in the bottom of a complete tube base. The bottom wall of each mold cavity in the chase is provided with holes correspondingly arranged and dimensioned to receive the metal prongs which are placed on the mold base pins. The ejector plate 158 has on its upper face ejecting pins 159 conforming in arrangement to the insert holes in the chase and adapted to contact with the bottoms of the prongs and to eject the completed bases or at least to raise them in the chase sufficiently for easy hand removal.

The mode of operating the press for the production of these particular articles will now be described, and this description will enable skilled persons to understand various other methods of operating or manipulating the machine and especially the sub-press for properly handling other types of molds or for the production of various other articles.

During the main pressing operation, the main press plunger 4 is raised, supporting the mold with the chase raised slightly from contact with the table, and squeezing the mold parts together with powerful pressure against the upper main press abutment. For this class of articles produced from a phenolic condensation product composition, heat (steam) is continuously supplied to the upper and lower thermal jackets 15 and 17 of the main press to properly fuse, or complete the fusion of the material, and then to cause it to set in permanent form while under pressure. During this operation, which requires a substantial amount of time (varying with type or size of articles produced and with the nature of the composition) various operations are performed at the sub-press station. When the main pressing operation is nearly completed and before the main plunger is lowered, the swing frame 26 at the sub-press station is locked down and the upper head 25 is raised. The lower head 21 is raised, supporting a loaded mold with partly pressed articles therein. The main press valve lever 6 is now moved to cause the main plunger to drop. In the first part of this movement, lever extension 90 acts on releasing hook 91 to drop the lower sub-press head in a manner previously described. This causes the mold to drop slightly so that it is supported by chase flanges 153 upon the table; the pin plate 151 which has been applied to the bottom of the chase in a manner described hereafter, is supported by frictional contact of its dowel pins 162 in the chase holes and also by friction of the inserts (tube base prongs 182) in the corresponding chase holes 157. The force plate 152 lies upon the chase with the mold plunger formations partly inserted in the chase mold recesses by a previous action of the sub-press, as further referred to later. After the first slight movement downward of the main plunger, its further movement acts through the linkage previously explained, including lever 45, bell crank 45e, etc., to rotate the table one-half turn, taking the loaded and "pre-pressed" mold from the sub-press to the main press, and bringing the mold containing completed articles from the main press to the sub-press. The main press valve lever 6 is then operated to raise the main press plunger, applying pressure to the newly positioned mold for the main pressing operation. In the first part of the upward movement of the main plunger, the linkage previously explained, including lever 46, link 95 and hook 94 acting on the rear extension 92 of the foot lever 77, elevates the lower sub-press head 21, bringing it in contact with the pin plate and raising the chase slightly from its supports upon the table. The lower gripper lever 106 is operated to move the gripper arms 101 so that the chase dowels 108 engage in the arm holes 107 and the hooks 100 engage the chase flanges 154, thus locking the pin plate and chase to the lower head. The upper head is now lowered by proper movement of the sub-press valve lever 119 and the upper gripper hooks 133 are engaged with the force plate 152. The upper head is then raised by power to pull the force plate clear of the chase and out of the completed articles therein. The lower gripper hooks are now operated to release the chase and still maintain engagement with the pin plate by means of its studs 108 engaging in the hook arm holes 107. The releasing treadle 80 is then operated to first rotate cams 70 in the table dropping direction, and then to positively pull down the lower head by the positive connecting links 83, bringing the pin plate down clear from the chase. The pin plate is then in line with rails 171 and is slid out to the right, while the ejector plate 158 is slid on its rails 170 from the left under the chase. The swinging spacing or hold down lugs 142 on the upper head are now dropped ready to engage the top chase. The lower head is raised to bring the ejector plate 159 against the lower ends of the inserts of the completed articles; the upper head is then lowered by power and swing lugs just mentioned engage the chase and force it down with a positive ejector action in which the ejector plate pins pass up through the chase holes and raise the completed articles in the mold cavities sufficiently at least to permit easy removal by hand. The swing stops spacers or lugs 142 are of such length that when the upper head comes down, they engage the chase and force it down in spaced relation to the force plate without permitting the mold plungers to re-enter the cavities of the completed articles.

The upper head is now raised to relieve the strain on the hold down latch. The handles of the swing lugs above mentioned are manipulated to raise these lugs to horizontal, idle position; latch 31 is moved to release the swing frame, which is raised, carrying the upper head with the force plate away up clear of the chase. The lower head is dropped to pull the ejector plate in the same manner as explained in connection with the pin plate. During the described operations, an operator has placed the inserts on the pin plate, which is now moved to the left to proper position below the chase, while the ejector plate is moved away to the left. The swing frame is now down and locked and the upper head is lowered to forced the tube base prongs carried by the pin plate into the chase holes. The upper head is then raised to relieve pressure on the chase, and the swing frame is unlatched and raised, leaving the chase clear for re-loading. The molds are now charged with suitable material, which in the present instance, is a pulverized mixture consisting of a suitable body and bakelite binder. A new and improved mold charger forming part of the invention, and its mode of use, are described hereafter. In order to be certain that the mold cavities are properly filled, so that there will not be any shortage of material at the tops of the completed articles, it is usually necessary to supply a slight excess of material, and in the main molding operation this excess material is spread over the upper surface of the chase and connects the upper edges of the finished tube bases with a very thin web of completed phenolic condensation product which facilitates the operation of removing the articles from the chase after the ejector action. The complete product of one molding operation may, by reason of this connecting web, be removed as a unit and the web then easily broken away to produce the individual articles.

The molds being properly charged, the swing frame is moved down and locked, and the upper head is lowered with full pressure to pre-press the material substantially, usually as much as possible. In the meantime, the material is somewhat heated and in some cases partially (more or less) fused by heat from the sub-press thermal jackets. For this purpose any desired degree of heat may be maintained in the jackets by supply of steam. In some cases, however, and in the present case, after the press has been in operation a short time, the sub-press jackets are sufficiently heated by heat transferred to them from the hot molds coming from the main press, and it is not necessary to supply additional heat. If the heat transferred in this way is greater than required this can be overcome to any desired extent by supplying cooling medium, usually water, to the sub-press jackets.

The upper grippers are now released and the upper head is raised clear of the force plate. The main press lever is then moved to cause the main plunger to drop. In the first part of this movement the lower head is dropped in the manner previously described. This completes one cycle, and the operations may be continued indefinitely, with the production of a large output of finely finished articles in a given time, with reduced labor cost and with very greatly reduced strain and fatigue to the operator or operators, as compared with previously available presses and methods of operation necessary in connection with them.

Figs. 14, 15 and 16 show the new and improved mold charger above mentioned. It comprises a bottom plate 200 having dowels 201 to fit holes in the chase, which may be the holes provided for co-operation with the force plate dowels 160. Headed studs 202 pass through slots 203 in a top plate 204 to secure the top plate slidably upon the bottom plate. Desirably, the slots are arranged diagonally and one of them is formed in a handle 205 extending diagonally, so that the top plate moves in a diagonal direction in the shaking operation. This arrangement may be varied in accordance with the mold and the convenience of the operator in applying the filler 2 and shaking it to fill the molds. The top plate carries an open box 206 in which the pulverized material is placed. The bottom plate has holes 207 to register with the mold cavities and the top plate has correspondingly arranged holes 208, the thin plate edges 209 forming the walls of these holes being preferably tapered so that they have a knifelike lower edge in contact with the bottom plate. Lifting handles 210 connected to the top plate are also desirably provided.

The filler with its receptacle or box containing the molding material, which is replenished from time to time, is placed upon the chase with the dowels 201 in the chase holes to register the bottom holes of the filler with the mold cavities, and then by the handle 205 the upper plate with the box is shaken, or moved to and fro several times diagonally to agitate the material and cause it to pass through the holes and properly fill the mold cavities. The thickness of the filler bottom plate allows for the slight excess of molding material referrred to in the general operative description. When the cavities are filled the handle is pulled out to the limit so that the upper and lower filler holes are out of registry and no material can escape. The filler is then removed and the molding operation is carried out as explained above.

I claim:

1. Press mechanism comprising a main press, a sub-press, hydraulic actuating means therefor, a mold carrier, and means associated with the sub-press for engaging and separating mold parts.

2. Press mechanism comprising a main press, a power actuated sub-press, a mold carrier, and means associated with the sub-press for engaging and separating mold parts by power actuation of the sub-press.

3. Press mechanism comprising a main press, a revoluble mold transfer table, and a sub-press including movably mounted upper and lower heads, hydraulic means for moving one of them, and manually operable power multiplying means for moving the other head.

4. Press mechanism comprising a main press, a sub-press including upper and lower heads, means for lifting the lower head, and means acting automatically upon operation of the main press to drop the lower sub-press head.

5. Press mechanism comprising a main press, a sub-press including upper and lower heads, means for lifting the lower head, and means acting automatically upon downward movement of the main press plunger to cause the lower sub-press head to drop.

6. Press mechanism comprising a main press, a sub-press including upper and lower heads, manually operated means for raising the lower sub-press head, said means acting also to retain it in elevated position, and means acting automatically upon movement of the main press in one direction to cause the lower sub-press to drop.

7. Press mechanism comprising a movable press head, power means for moving the head, mold gripping means associated with the head, and means for advancing and retracting said gripping means.

8. Press mechanism comprising a movable head, hydraulic means for moving the head, mold manipulating means carried by the head, and means for advancing and retracting said gripping means.

9. Press mechanism comprising a press, a mold chase, means for supporting and moving the chase to and from the press, and means for movably supporting a mold base for movement to the press and association with the chase and for removal of the same.

10. Press mechanism comprising a press, a mold chase, means for supporting and moving the chase to and from the press, a mold base and an ejector base for alternate co-operation with the chase.

11. Press mechanism comprising an upper and a lower press head, means for moving the lower head up and down, means for moving a mold chase to and from the press, and supports adjacent the lower head for a mold base and an ejector base which may be alternately moved to operative position between the lower head and the mold chase.

12. Press mechanism comprising an upper and a lower press head, means for moving the lower head up and down, means for moving a mold chase to and from the press, and guides extending at opposite sides of the lower head for movably supporting a mold base and an ejector base which may be alternately moved between the lower head and the chase.

13. Press mechanism comprising an upper and a lower press, means for moving the lower head up and down, means for moving a mold chase to and from the press, guideways extending at opposite sides of the lower head, and spaced connected base plates supported on the guides for simultaneous movement by which one is positioned between the lower head and the mold chase while the other is moved to accessible position clear of the press.

14. Press mechanism comprising an upper and a lower press head, means for moving the lower head up and down, means for moving a mold chase to and from the press, guideways extending at opposite sides of the lower head, and spaced connected base plates supported on the guides for simultaneous movement by which one is positioned between the lower head and the mold chase while the other is moved to accessible position clear of the press, one of the plates being provided with means to co-operate with formations in the chase.

15. Press mechanism comprising an upper and a lower press head, means for moving the lower head up and down, means for moving a mold chase to and from the press, guideways extending at opposite sides of the lower head, and spaced connected base plates supported on the guides for simultaneous movement by which one is positioned between the lower head and the mold chase while the other is moved to accessible position clear of the press, one of the plates being provided with insert-receiving means.

16. Press mechanism comprising an upper and a lower press head, means for moving the lower head up and down, means for moving a mold chase to and from the press, guideways extending at opposite sides of the lower head, and spaced connected base plates supported on the guides for simultaneous movement by which one is positioned between the lower head and the mold chase while the other is moved to accessible position clear of the press, one of the plates having ejector means to co-operate with the molded articles through openings in the chase.

17. Press mechanism designed for co-operation with a three-part mold including the chase, a base, and a top or force plate, said mechanism comprising upper and lower heads, means for moving one of the heads, movable means carried by one of the heads to engage and release the force plate and movable means carried by the other head to engage and release the chase and the base, the last named means being arranged to maintain engagement with the base while free from engagement with the chase.

18. A molding press comprising a central column, a table rotatably mounted thereon and having mold apertures, a main power press at one side of the column, a power actuated sub-press at the other side of the column and mold co-operating and separating means associated with the sub-press.

19. A molding press comprising a central column, a table rotatably mounted thereon and having mold apertures, a main power press at one side of the column, a power actuated sub-press at the other side of the column, the sub-press comprising upper and lower heads, means for operating one of the heads, power means for operating the other head, and mold engaging and separating means carried by the heads.

20. Press mechanism comprising a movable press head, power means for moving the head, and power multiplying means acting between the power means and the head to amplify the pulling effect of the power means during a part of its action in one direction.

21. Press mechanism designed to co-operate with a chase having apertures to receive inserts, said mechanism comprising a press, means for supporting the chase in relation to the press, a mold base having means for supporting inserts, and means for supporting the base for movement to a free position where inserts may be applied and to a position adjacent the chase whereupon the inserts may be positioned in the chase insert apertures by movement of the base to co-operative relation with the chase.

22. Press mechanism designed to co-operate with a chase having apertures to receive inserts, said mechanism comprising a press, means for supporting the chase in relation to the press, a mold base having means for supporting inserts, means for supporting the base for movement to a free position where inserts may be applied and to a position adjacent the chase, and means for moving the base to co-operative relation with the chase, whereby the inserts are positioned in the chase insert apertures.

23. Molding press mechanism comprising a press, a mold chase, means for supporting the chase in relation to the press, a mold base having means for supporting inserts, means for supporting the base for horizontal movement to a free position for application of inserts and to a position below the chase, and means for bringing the base into co-operative relation with the chase by vertical movement whereupon the inserts are located in the chase insert apertures, and for thereafter separating the base and chase to admit lateral movement of the base.

Signed at New York, in the county of New York and State of New York, this 16th day of July, A. D. 1925.

GEORGE HOWLETT DAVIS.